US011236193B2

(12) United States Patent
Suen et al.

(10) Patent No.: US 11,236,193 B2
(45) Date of Patent: Feb. 1, 2022

(54) SILANE MODIFIED POLYMERS WITH IMPROVED CHARACTERISTICS FOR ADHESIVE COMPOSITIONS

(71) Applicants: Henkel IP & Holding GmbH, Duesseldorf (DE); Henkel AG & Co. KGaA, Duesseldorf (DE)

(72) Inventors: Wu Suen, Pennington, NJ (US); Andrea Keys Eodice, Hillsborough, NJ (US); Claudia Meckel-Jonas, Duesseldorf (DE); Johann Klein, Duesseldorf (DE); Christina Despotopoulou, Minneapolis, MN (US); Jan-Erik Damke, Duesseldorf (DE)

(73) Assignees: Henkel AG & Co. KGaA, Duesseldorf (DE); Henkel IP & Holding GmbH, Duesseldorf (DE)

( * ) Notice: Subject to any disclaimer, the term of this patent is extended or adjusted under 35 U.S.C. 154(b) by 209 days.

(21) Appl. No.: 16/671,697

(22) Filed: Nov. 1, 2019

(65) Prior Publication Data

US 2020/0063007 A1  Feb. 27, 2020

Related U.S. Application Data

(63) Continuation of application No. PCT/US2018/030601, filed on May 2, 2018.

(60) Provisional application No. 62/500,541, filed on May 3, 2017.

(51) Int. Cl.

| *C08G 18/83* | (2006.01) |
| *C08G 18/24* | (2006.01) |
| *C08G 18/32* | (2006.01) |
| *C08G 18/48* | (2006.01) |
| *C08G 18/66* | (2006.01) |
| *C08G 18/75* | (2006.01) |
| *C09J 175/12* | (2006.01) |
| *C08G 18/12* | (2006.01) |
| *C09J 175/04* | (2006.01) |
| *C09J 175/08* | (2006.01) |

(52) U.S. Cl.
CPC .......... *C08G 18/837* (2013.01); *C08G 18/12* (2013.01); *C08G 18/246* (2013.01); *C08G 18/3275* (2013.01); *C08G 18/4829* (2013.01); *C08G 18/6688* (2013.01); *C08G 18/755* (2013.01); *C09J 175/04* (2013.01); *C09J 175/08* (2013.01); *C09J 175/12* (2013.01)

(58) Field of Classification Search
CPC ............ C08G 18/3271; C08G 18/3275; C08G 18/6688; C08G 18/837
See application file for complete search history.

(56) References Cited

U.S. PATENT DOCUMENTS

| 3,632,557 | A | 1/1972 | Brode et al. |
| 3,971,751 | A | 7/1976 | Isayama et al. |
| 3,979,344 | A | 9/1976 | Bryant et al. |
| 4,960,844 | A | 10/1990 | Singh |
| 5,225,512 | A | 7/1993 | Baghdachi et al. |
| 5,990,257 | A | 11/1999 | Johnston et al. |
| 6,124,387 | A | 9/2000 | Wang et al. |
| 6,197,912 | B1 | 3/2001 | Huang et al. |
| 6,924,321 | B2 | 8/2005 | Casati et al. |
| 7,307,134 | B2 | 12/2007 | Lim et al. |
| 7,557,173 | B2 | 7/2009 | Bachon et al. |
| 8,450,411 | B2 | 5/2013 | Zander et al. |
| 8,772,421 | B2 | 7/2014 | Bachon et al. |
| 9,365,751 | B2 | 6/2016 | Suen |
| 10,301,422 | B2 | 5/2019 | Kramer et al. |
| 10,407,533 | B2 | 9/2019 | Kramer et al. |
| 2006/0270807 | A1 | 11/2006 | Zhu et al. |
| 2007/0129528 | A1 | 6/2007 | Huang et al. |
| 2007/0142607 | A1* | 6/2007 | Harasin ............. C08G 18/4841 528/44 |
| 2011/0118432 | A1 | 5/2011 | Zhao et al. |
| 2011/0306723 | A1 | 12/2011 | Choffat |
| 2012/0273731 | A1 | 11/2012 | Moralez et al. |
| 2013/0102738 | A1 | 4/2013 | Stanjek et al. |
| 2014/0155545 | A1 | 6/2014 | Stanjek et al. |
| 2016/0152752 | A1 | 6/2016 | Klemarczyk et al. |
| 2016/0297918 | A1 | 10/2016 | Sophiea et al. |
| 2019/0284457 | A1* | 9/2019 | Nakamura ............. C09J 175/06 |
| 2019/0322791 | A1* | 10/2019 | Rider ................. C08G 18/4244 |

FOREIGN PATENT DOCUMENTS

| EP | 0370464 A2 | 5/1990 |
| EP | 0397036 A2 | 11/1990 |
| EP | 0601021 A1 | 6/1994 |
| EP | 0931800 A1 | 7/1999 |
| WO | 2008077045 A2 | 6/2008 |
| WO | 2016083309 A1 | 6/2016 |
| WO | 2016083312 A1 | 6/2016 |
| WO | 2016105915 A1 | 6/2016 |

OTHER PUBLICATIONS

International Search Report for International PCT Patent Application No. PCT/US2018/029546 dated Aug. 2, 2018.
International Search Report for International PCT Patent Application No. PCT/US2018/030601 dated Aug. 9, 2018.
Casati et al., "Influence of Non-Fugitive Catalysis on Physical Characteristics of Automotive Polyurethane Molded Foam," The Dow Chemical Company, 13 pages.

* cited by examiner

*Primary Examiner* — Marc S Zimmer
(74) *Attorney, Agent, or Firm* — James E. Piotrowski

(57) ABSTRACT

Disclosed are silane modified copolymers that are moisture curable; curable adhesive compositions comprising the silane modified copolymers; and methods of making the silane modified copolymers.

15 Claims, No Drawings

SILANE MODIFIED POLYMERS WITH IMPROVED CHARACTERISTICS FOR ADHESIVE COMPOSITIONS

TECHNICAL FIELD

This invention relates generally to silane modified polymers and more particularly to silane modified copolymers for utilization in adhesive compositions.

BACKGROUND OF THE INVENTION

One-component, moisture-curing adhesives and sealants have for years played a significant role in numerous technical applications. In addition to the polyurethane adhesives and sealants having free isocyanate groups and the traditional silicone resin adhesives and sealants based on dimethylpolysiloxane backbone structures, the silane terminated polymers have also been increasingly used recently. Adhesives and sealants based on silane terminated polymers have the advantage, as compared with the polyurethane adhesives and sealants, of being free of isocyanate groups, in particular of monomeric diisocyanates; they are also notable for a broad adhesion spectrum to a plurality of substrates without surface pretreatment using primers.

Silane terminated polymers are polymer systems comprising an organic polymer backbone, for example polyurethane or polyether and reactive, crosslinkable silyl alkoxy groups. Silane terminated polymers are different from silicone resins in that they do not have siloxane (—Si—O—Si—) linkages in the backbone. In the presence of atmospheric moisture these silyl alkoxy terminated polymers are capable, at room temperature, of crosslinking and curing to form, depending on the concentration of alkoxysilyl groups and their configuration, long-chain polymers (thermoplastics), relatively wide-mesh three-dimensional networks (elastomers), or highly crosslinked systems (thermosets).

Methods for the manufacture of some silane-terminated polymers are described in U.S. Pat. No. 3,971,751, EP-A-70475, U.S. Pat. Nos. 6,197,912, 6,124,387, 5,990,257, 4,960,844, 3,979,344, 3,632,557, 7,307,134, 7,557,173, 8,772,421, EP-A-601021, EP-A-370464, EP-A-397036, EP-A-931800, EP-A-153940.

Silane terminated polymers when cured have acceptable strength for many bonding applications. However, it is desirable to provide improved properties to adhesive compositions that require minimal changes to the base adhesive formulation and minimal changes to the processing of the adhesive.

SUMMARY OF THE INVENTION

In general terms, this invention provides an improved moisture curable adhesive composition that has improved adhesive properties, improved tensile properties and that can easily be incorporated into existing adhesive formulations.

In one embodiment the silane modified polymer is the reaction product of an aminosilane and an isocyanate functional prepolymer that is the reaction product of a high molecular weight polyether polyol and an amine based diol containing secondary hydroxyl groups and a cycloaliphatic diisocyanate.

Another embodiment comprises a method of forming a silane modified polymer comprising the steps of: a) forming a mixture of urethane terminated prepolymers by reacting a mixture of amine based diol containing secondary hydroxyl groups, a high molecular weight polyether polyol and a cycloaliphatic diisocyanate, optionally in the presence of a urethane catalyst; and b) reacting the mixture of urethane terminated prepolymers of step a) with at least one aminosilane, thereby forming the silane modified polymer.

Another embodiment is an adhesive composition comprising the silane modified copolymer of this disclosure with a silane resin and/or a siloxane resin. The silane resins typically have a molecular weight of about 500 or less and reactive silylalkoxy and/or aminosilane moieties. The siloxane resin has typically have a molecular weight of about 1,000 or less and silylalkoxy moieties. Preferably, the siloxane resin also includes one or more aromatic ring moieties.

The disclosed compounds include any and all isomers and stereoisomers. In general, unless otherwise explicitly stated the disclosed materials and processes may be alternately formulated to comprise, consist of, or consist essentially of, any appropriate components, moieties or steps herein disclosed. The disclosed materials and processes may additionally, or alternatively, be formulated so as to be devoid, or substantially free, of any components, materials, ingredients, adjuvants, moieties, species and steps used in the prior art compositions or that are otherwise not necessary to the achievement of the function and/or objective of the present disclosure.

When the word "about" is used herein it is meant that the amount or condition it modifies can vary some beyond the stated amount so long as the function and/or objective of the disclosure are realized. The skilled artisan understands that there is seldom time to fully explore the extent of any area and expects that the disclosed result might extend, at least somewhat, beyond one or more of the disclosed limits. Later, having the benefit of this disclosure and understanding the concept and embodiments disclosed herein, a person of ordinary skill can, without inventive effort, explore beyond the disclosed limits and, when embodiments are found to be without any unexpected characteristics, those embodiments are within the meaning of the term about as used herein.

DETAILED DESCRIPTION OF A PREFERRED EMBODIMENT

The present disclosure is directed toward a moisture curable adhesive composition comprising specific silane modified copolymers that are a reaction product of an aminosilane and urethane terminated prepolymer, wherein the prepolymer is a block copolymer comprising polyether polyol blocks and amine based diol blocks. This silane modified polymer has surprisingly improved adhesive properties, surprisingly improved tensile properties and that can easily be incorporated into existing adhesive formulations.

Silane modified polymers and copolymers are polymer systems comprising an organic polymer backbone, for example polyurethane or polyether and reactive and crosslinkable alkoxysilane groups. Silane terminated polymers are different from silicone or siloxane resins in that they do not have siloxane linkages in the backbone. In the presence of atmospheric moisture these alkoxysilane-terminated polymers are capable, at room temperature, of crosslinking and curing to form, depending on the concentration of alkoxysilyl groups and their configuration, long-chain polymers (thermoplastics), relatively wide-mesh three-dimensional networks (elastomers), or highly crosslinked systems (thermosetting plastics).

The following definitions apply in the present specification and claims. An alkyl is an alkane minus one hydrogen and it can be acyclic in which case the general formula is $C_nH_{2n+1}$ or cyclic in which case the general formula is $C_nH_{2n-1}$. An alkoxy is an alkyl group bound to an oxygen by a single bond, the simplest example being $CH_3$—O—. A polyol is a compound having multiple hydroxyl functional groups; they can be monomers or polymers. A polyether is a polymer having the linkage —$R_1$—O—$R_2$— with $R_1$ and $R_2$ being independently an alkyl or aryl group. Generally they are formed from oxides such as ethylene oxide or propylene oxide. A polyether polyol has a polyether backbone with at least terminal hydroxyl functional groups. An amine-based polyether polyol refers to a polyether polymer having secondary and/or tertiary amine groups in its backbone along with at least terminal hydroxyl functional groups. In the present specification and claims the term aminosilane refers to a silane that includes an amine function, preferably a secondary amine function, within its structure. An exemplary aminosilane includes a structure such as $R1NH_1$—$(CH_2)_3$—$Si(R2)_3$. The R2 groups pendent from the silicon atom are preferably alkoxy and/or alkyl substituents, however at least one substituent must be alkoxy. The R1 group can be H or any other substituent such as an alkyl group. One example of an aminosilane that is suitable in the present invention is N-(n-Butyl)-3-aminopropyltrimethoxysilane, commercially available as Dynasylan® 1189. It has the structure of $CH_3$—$(CH_2)_3$—NH—$(CH_2)_3$—Si—$(O$—$CH_3)_3$. Another example is the bipodal aminosilane compound Bis(trimethoxysilypropyl)amine, commercially available as Silquest® A-1170, and having the following structure $(CH_3$—$O)_3$—Si—$(CH_2)_3$—NH—$(CH_2)_3$ —Si—$(O$—$CH_3)_3$. A bipodal aminosilane has multiple, terminal —SiXYZ end groups wherein X, Y and Z are each independently selected from C1-C8 alkyl groups or C1-C8 alkoxy groups. In this regard, at least one, preferably two and more preferably all, of the groups X, Y, Z must be a hydrolysable group, i.e. a C1-C8 alkoxy group. Alkoxy groups, especially methoxy, ethoxy, propoxy and butoxy groups, are preferably selected as the hydrolysable groups. A siloxane oligomer refers to a compound having one or more Si—O—Si units in the backbone and a Mw of about 1,000 or less. The siloxane oligomer can include one or more hydrolysable groups. Unless otherwise defined molecular weight refers to number average molecular weight $M_n$.

The silane modified copolymer is prepared in a multistep process. Initially, an amine based diol containing secondary hydroxyl groups, a higher molecular weight polyether polyol, an excess of equivalents of one or more aliphatic or cycloaliphatic diisocyanates, and optionally a urethane catalyst, are combined and reacted to form a mixture of isocyanate terminated prepolymers. The mixture of isocyanate terminated prepolymers that form in this step include: an isocyanate functional reaction product of amine based diol containing secondary hydroxyl groups and cycloaliphatic diisocyanate; an isocyanate functional reaction product of the higher molecular weight polyether polyol and cycloaliphatic diisocyanate; and an isocyanate functional copolymer reaction product of the higher molecular weight polyether polyol and the amine based diol containing secondary hydroxyl groups and cycloaliphatic diisocyanate. The copolymer will have a backbone comprising blocks from the polyether polyol and blocks from the amine based diol. In a second step the mixture of urethane terminated prepolymers is then subjected to an end-capping reaction with an aminosilane to convert them to silane terminated prepolymers. Preferably the aminosilane is bipodal.

Some examples of aminosilane compounds include 3-aminopropyltrimethoxysilane, 3-am inopropyltriethoxysilane, N-(2-aminoethyl-3-aminopropyl)trimethoxysilane, 3-aminopropylmethyldiethoxysilane, 4-amino-3,3-dimethylbutyltrimethoxysilane, N-(n-butyl)-3-aminopropyltrimethoxysilane, 1-butanamino-4-(dimethoxymethylsilyl)-2,2-dimethyl, (N-cyclohexylaminomethyl)triethoxysilane, (N-cyclohexylaminomethyl)-methyldiethoxysilane, (N-phenylaminoethyl)trimethoxysilane, (N-phenylaminomethyl)-methyldimethoxysilane or gamma-ureidopropyltrialkoxysilane. Useful compounds include N-(n-butyl)-3-aminopropyltrimethoxysilane, available as Dynasylan 1189 from Evonik Industries and Silquest A1170 available from Momentive Performance Materials Inc. Silquest A1170 is a bis-silane or a bipodal silane and advantageously provides twice the number of silylalkoxy groups which leads to additional crosslinking and further property improvement of the final composition, and thus particularly preferred.

Higher molecular weight polyether polyols suitable for use in the present invention are not particularly limited. As the chain length of the polyether polyol is increased the more elastic the polyether polyol will become, meaning its modulus of elasticity will be low. In addition, if branching is introduced into the backbone this increases the strength of products formed from these polyether polyols. The higher molecular weight polyether polyols have a molecular weight greater than 2000 and preferably a molecular weight greater than 6000 and most preferably greater than 10,000. The number average molecular weight $M_n$, as well as the weight average molecular weight $M_w$, is determined according to the present invention by gel permeation chromatography (GPC, also known as SEC) at 23° C. using a styrene standard. This method is known to one skilled in the art. The polydispersity is derived from the average molecular weights $M_w$ and $M_n$. It is calculated as $PD=M_w/M_n$.

Particularly advantageous viscoelastic properties can be achieved if polyethers having a narrow molecular weight distribution, and thus low polydispersity, are used. These can be produced, for example, by so-called double metal cyanide catalysis (DMC catalysis). Polyethers produced in this way are distinguished by a particularly narrow molecular weight distribution, by a high average molecular weight and by a very low number of double bonds at the ends of the polymer chains. In a special embodiment of the present invention, the maximum polydispersity $M_w/M_n$ of the polyether on which the polymer is based is therefore 3, particularly preferably 1.7 and most particularly preferably 1.5.

Also advantageous are diols. Diols have a functionality of about 2 and can limit undesirable crosslinking. One suitable polyether diol is the Acclaim® polyether diols formed using a double metal cyanide catalyst and having a narrow polydispersity index and a number average molecular weight of 11,200.

The polyether polyol or diol is present in an of more than 10%, preferably more than 50% and advantageously more than 80% based on the total weight of the amine based diol containing secondary hydroxyl groups and the higher molecular weight polyether polyol.

The amine based diol containing secondary hydroxyl groups advantageously includes in its backbone structure one or more secondary and/or tertiary amines. Preferably, the amine based diol containing secondary hydroxyl groups comprises only tertiary amines. Preferably the amine based diol containing secondary hydroxyl groups has a number average molecular weight of less than 6,000 and more preferably less than 3,000. Preferably it has a functionality of about 2. Use of amine based diols having a functionality of about 3 or more will result in decreased properties and should not be used.

The amine based diol containing secondary hydroxyl groups preferably is present in a positive amount of 90 weight % or less, preferably 50% or less and more preferably 20 weight % or less based on the total weight of the amine based diol containing secondary hydroxyl groups and the higher molecular weight polyether polyol. One suitable example of an amine based diol containing secondary hydroxyl groups is an amine-based polyether polyol having a number average molecular weight of 933, a plurality of tertiary amines and secondary hydroxyl functions in its backbone and a hydroxyl value of 120 mg KOH/gram. Commercially it is available as Adiansol® MA3180.

Polyfunctional isocyanates are suitable as the polyisocyanates in the isocyanate component. The isocyanates can contain two to five, preferably two to four, NCO groups on the average. Examples of suitable isocyanates include aromatic isocyanates such as 1,5-naphthylene diisocyanate, 2,4- or 4,4'-diphenylmethane diisocyanate (MDI), carbodiimide-modified MDI, xylylene diisocyanate (XDI), m- and p-tetramethylxylylene diisocyanate (TMXDI), the isomers of tolylene diisocyanate (TDI), 4,4'-diphenyl-dimethylmethane diisocyanate, di- and tetraalkyldiphenylmethane diisocyanate, 1,3-phenylene diisocyanate, 1,4-phenylene diisocyanate, 4,4'-dibenzyl diisocyanate; aliphatic isocyanates, such as hydrogenated MDI (H12MDI), 1-methyl-2,4-diiso-cyanatocyclohexane, 1,12-diisocyanatododecane, 1,6-diisocyanato-2,2,4-trimethyl-hexane, 1,6-diisocyanato-2,4,4-trimethylhexane, 1-isocyanatornethyl-3-isocyanato-1,5,5-trimethylcyclohexane (IPDI), tetramethoxybutane-1,4-diisocyanate, butane-1,4-diisocyanate, hexane-1,6-diisocyanate (HDI), dimeric fatty acid diisocyanate, dicyclohexylmethane diisocyanate, cyclohexane-1,4-diisocyanate, isocyanurates, carbodiimidies, biurets of isocyanates, ethylene diisocyanate or phthalic acid bisisocyanato ethyl ester. Preferred polyfunctional isocyanates include aliphatic and cycloaliphatic diisocyanates. Aliphatic and cycloaliphatic diisocyanates are advantageous as they provide a composition having a combination of low viscosity and resistance to ultraviolet radiation exposure. One advantageous cycloaliphatic diisocyanates useful in the present compositions is isophorone diisocyanate (IPDI).

A catalyst may be useful to enhance the copolymer reaction. Useful urethane catalysts are also well known in the art and include, by way of example: tertiary amine catalysts, alkyl tin carboxylates, alkyl tin oxides, alkyl tin mercaptides, triethylenediamine (TEDA, also called DABCO, 1,4-diazabicyclo[2.2.2]octane), dimethylcyclohexylamine (DMCHA), dimethylethanolamine (DMEA), dibutyl tin oxide, and dibutyltin dilaurate. The level of catalyst in the composition will depend on the type of catalyst used, but can range from about 0.001 to about 5 wt. %, advantageously from about 0.005 to about 3 wt. % and more advantageously from about 0.01 to about 0.5 wt. %, based on the total weight of the adhesive composition.

The adhesive composition can optionally comprise conventional additives known to a person skilled in the art. Conventional additives which are compatible with a composition according to this invention may simply be determined by combining a potential additive with the composition and determining if they remain homogenous. Non-limiting examples of useful additives include, without limitation, silane resin; siloxane resin; filler; moisture scavenger; plasticizer; reactive diluent; rheology modifier; adhesion promoter; catalyst; UV stabilizer; colorant such as pigment and/or color paste, defoamer and combinations thereof.

Silane resins typically have a molecular weight of about 500 or less and reactive silylalkoxy and/or aminosilane moieties. Useful silane resins include compounds of various aminosilane and oligomeric silane compounds that are familiar to the people working in the field. Some examples of aminosilane compounds include 3-aminopropyltrimethoxysilane, 3-aminopropyltriethoxysilane, N-(2-aminoethyl-3-aminopropyl)trimethoxysilane, 3-aminopropylmethyldiethoxysilane, 4-amino-3,3-dimethylbutyltrimethoxysilane, N-(n-butyl)-3-aminopropyltrimethoxysilane, 1-butanamino-4-(dimethoxymethylsilyl)-2,2-dimethyl, Bis(trimethoxysilylpropyl)amine, Bis(triethoxysilylpropyl)amine, (N-cyclohexylaminomethyl)triethoxysilane, (N-cyclohexylaminomethyl)-methyldiethoxysilane, (N-phenylaminoethyl)trimethoxysilane, (N-phenylaminomethyl)-methyldimethoxysilane or gamma-ureidopropyltrialkoxysilane. Examples of oligomeric silane compounds include Sivo 203, Sivo 210, Sivo 214 from Evonik Corp, etc. The silane resin may comprise about 0-50 wt. %, more preferably 0-20% wt. % of adhesive composition. Depending upon the different adhesive compositions, the silane resins may function as adhesion promoters and/or coupling agents.

Another useful additive is siloxane resin. The siloxane resin typically have a molecular weight of about 1,000 or less, at least one —Si—O—Si— bond, and silylalkoxy moieties. Preferably, the siloxane resin also includes one or more aromatic ring moieties in the structure. One preferred example is diphenyltetramethoxydisiloxane. The siloxane resin may comprise about 0-50 wt. %, more preferably 0-20% wt. % of adhesive composition.

Other additives useful in certain applications include, but are not limited to, air release agent; fungicide; flame retardant and combinations thereof. The total level of conventional additives will vary depending on amount of each particular additive needed to provide the moisture curable adhesive composition with desired properties. The level of additives can be from 0 to 80%.

The curable composition will typically have the following components and concentrations.

| component | range (wt. %) | preferred range (wt. %) |
| --- | --- | --- |
| silane modified copolymer | 5-70 | 10-50 |
| silane resin | 0-50 | 0-20 |
| siloxane resin | 0-50 | 0-20 |
| filler | 0-80 | 20-60 |
| moisture scavenger | 0-20 | 1-10 |
| plasticizer | 0-60 | 0-40 |
| reactive diluent | 0-60 | 0-30 |
| rheology modifier | 0-30 | 1-10 |
| adhesion promoter | 0-20 | 0.1-5 |
| catalyst | 0-5 | 0.005-1.5 |
| UV stabilizer | 0-2 | 0-2 |
| colorant | 0-30 | 0-20 |

The curable adhesive composition can be prepared by mixing the non-reactive components until homogeneously blended. This is followed by mixing the reactive components to the blended non-reactive components. Mixing should be done in a controlled atmosphere to exclude moisture and prevent crosslinking and curing of the silane modified copolymer and/or composition. The adhesive compositions in the uncured state will be pasty solids.

The adhesive compositions are useful for bonding articles composed of a wide variety of substrates (materials), including but not limited to wood, metal, polymeric plastics, glass, textiles and composites. The adhesive compositions can be used to bond articles together by applying the adhesive composition, typically at room temperature, to a first article substrate; and bringing a second article substrate in contact with the adhesive composition applied to the first article. After application of the second article the adhesive bond can be exposed to conditions suitable to crosslink the composition and cure it to an irreversible solid form. Conditions of 23° C. and 50% humidity for 24 hours are typically suitable to cure the disclosed composition to an irreversible solid form.

Example

Unless otherwise stated, the quantities listed below are understood to be in weight percent based on the total weight of the composition.

Skin Over Time (SOT)—Skin over time is tested by probing a film as it cures to establish the time at which the film becomes non-tacky.

Tensile test of neat cured film according to ASTM D-638—A film of the composition is cast in a template. Skin Over Time (SOT) of the cast film is recorded. The film is cured for 7 days or until fully cured. Dogbone samples are cut according to ASTM D-638, and tested in a tensile testing machine (Sintech 1D). Tensile modulus and Strain % at break for the sample are recorded. The higher the tensile modulus the higher the strength of that cured composition. The higher the Strain % the higher the flexibility and elongation of that cured composition.

Adhesion test—An adhesive composition is prepared. The compositions is applied, typically at room temperature, to a first test substrate; and a second test substrate is placed in contact with the adhesive composition applied to the first substrate. After application of the second substrate the adhesive bond is kept under constant temperature (23° C.) and humidity (50%) conditions to cure for 24 hours to an irreversible solid form. The cured bonds are tested by a tensile testing machine, for example by Instron, in lap shear mode at pulling speed of 0.5" per min until failure and the lap shear bond strength are recorded in PSI.

Adhesion Test on Wood

The adhesives is applied to *Ponderosa* Pine lap shear specimens that measure 1 inch by 4 inches. The application area was 1 inch by 1 inch, and the adhesive is applied to one of the specimens and then the second specimen is pressed on top of the adhesive and first specimen and the overlapped lap shear specimens are clipped together. This process was repeated two more times to make three total test samples. These bonds were then allowed to cure for 24 hrs in a 50% humidity, 22° C. room. Testing of the lap shear bonds for adhesion strength was then conducted on an Instron 5582, measuring the maximum tensile load required to break the bond in psi.

Control Silane Modified Polymer (SMP) A

SMP A is a silylalkoxy terminated homopolymer. SMP A was prepared as follows. Polypropylene ether polyol (Acclaim 12200, hydroxyl value=9.90) was dried under vacuum. Under a nitrogen atmosphere, 0.1 g of dioctyltin dilaurate (TIB Kat 216) was added with stirring. Then, 15.19 g (68.33 mmol) of IPDI was added (NCO/OH ratio=2.02) with stirring. The mixture was left for one hour at 80-90° C. When the % NCO<0.75, 17.09 g (72.60 mmol) of N-(3-(Trimethoxysilyl)propyl)butylamine (Dynasylan 1189) was added with stirring and the mixture was left for half an hour at 80-90° C. (% NCO=0.00). A linear, gamma-silane terminated polymer was obtained. The polymer was stored in a moisture-proof glass vessel under a nitrogen atmosphere to prevent moisture curing.

Copolymer 1 was prepared as follows. 27.7 g of an amine based diol containing secondary hydroxyl groups (Adiansol® MA3180) and 222.2 g of the higher molecular weight polyether polyol (Acclaim 12200) were combined and dried under vacuum. Under a nitrogen atmosphere 0.04 g of Reaxis 216 catalyst was added with stirring, followed by 22.4 g of IPDI. The mixture was left to react for about one hour at 80° C. 24.3 g of the aminosilane N-(n-Butyl)-3-aminopropyltrimethoxysilane was added to the stirred and heated mixture and reacted until the % NCO was about 0. The resulting copolymer was stored in a moisture-proof glass vessel under a nitrogen atmosphere to prevent moisture curing.

Copolymer 2 was prepared the same as Copolymer 1 except 35.2 g of the aminosilane Bis(trimethoxysilypropyl) amine was used in place of the 24.3 g of N-(n-Butyl)-3-aminopropyltrimethoxysilane.

Properties of cured reaction products of control homopolymer SMP A and Copolymer 1 and 2 are shown in the table below.

| Sample | SMP A | Copolymer 1 | Copolymer 2 |
| --- | --- | --- | --- |
| copolymer amount | 0 wt. % | 100 wt. % | 100 wt. % |
| control SMP A amount | 100 wt. % | 0 wt. % | 0 wt. % |
| Viscosity (cps, r.t.) | 70,000 | 50,650 | 38,000 |

Copolymer 2 has a surprisingly low viscosity compared to control SMP A. This is advantageous for formulating lowered viscosity compositions. Curable compositions made from Copolymer 1 and 2 both had higher modulus and adhesion strength compared to those made from homopolymer SMP A as shown below.

Curable adhesive compositions were prepared as using the formulations in the table below. Properties of cured reaction products of those compositions are also shown in the table below.

|  | Control B | Composition 3 | Composition 4 |
| --- | --- | --- | --- |
| polymer or copolymer | SMP A | 1 | 2 |
| polymer or copolymer amount (g) | 25 | 25 | 25 |
| Crosslinker[1] (g) | 0.25 | 0.25 | 0.25 |
| catalyst[2] (g) | 0.08 | 0.08 | 0.08 |
| SOT (min) | 56 | 56 | 25 |
| Modulus (psi) | 164 | 218 | 347 |
| Raw Peak strain (%) | 139 | 115 | 104 |

[1]Geniosil GF 91 from Wacker Chemie AG
[2]Reaxis 216 from Reaxis Inc.

Moisture curable adhesive composition 3, prepared from copolymer sample 1, had improved strength (as shown above by the increased modulus) and slightly decreased flexibility (as shown by the lower strain results) as compared to the similar Control B composition prepared using homopolymer SMP.

Moisture curable adhesive composition 4, prepared from copolymer sample 2, had surprising property improvements, with significantly higher modulus and shorter SOT, which indicates much stronger tensile strength and faster cure speed as compared to the similar Control B composition prepared using homopolymer SMP.

Curable compositions were prepared using the formulations in the below table. The mixed compositions were tested for 24 hour adhesion values using Ponderosa Pine substrates in a lap shear test. Values for the adhesion test are shown in the below table.

| Ingredients (grams) | Control C | Composition 5 | Composition 6 |
|---|---|---|---|
| polymer or copolymer | SMP A | 1 | 2 |
| polymer or copolymer amount (g) | 46 | 46 | 46 |
| catalyst[1] (g) | 0.2 | 0.2 | 0.2 |
| filler[2] (g) | 32 | 32 | 32 |
| Other[3] | | | |
| Shear Adhesion (psi) | 245 | 391 | 478 |

[1]Catalyst: Reaxis 216 from Reaxis Inc.
[2]Filler: calcium carbonate filler.
[3]Other ingredients are the same for all formulations, including crosslinker 2 g (Geniosil GF 91 from Wacker Chemie AG); moisture Scavenger 2.6 g (Dynasylan VTMO from Evonik Corp); rheology modifier 2 g (Rilanit M from BASF); and TiO$_2$ colorant 15 g.

Moisture curable adhesive composition 5, prepared from copolymer sample 1, had improved strength (as shown by the increased lap shear adhesion test results) as compared to the similar Control C composition prepared using homopolymer SMP.

Moisture curable adhesive composition 6, prepared from copolymer sample 2, had more adhesion improvements, with even higher adhesion value as compared to the similar Control C composition prepared using homopolymer SMP Curable compositions were prepared using the formulations in the below table. The mixed compositions were tested for 24 hour adhesion values using Ponderosa Pine substrates in a lap shear test. Values for the adhesion test are shown in the below table.

| Ingredients (grams) | Control C | Control D | Composition 6 | Composition 7 |
|---|---|---|---|---|
| polymer or copolymer | SMP A | SMP A | Sample 2 | Sample 2 |
| polymer or copolymer amount (g) | 46 | 32 | 46 | 32 |
| siloxane additive amount[1] (g) | 0 | 14 | 0 | 14 |
| catalyst[2] (g) | 0.2 | 0.2 | 0.2 | 0.2 |
| filler[3] (g) | 32 | 32 | 32 | 32 |
| Other[4] | | | | |
| Adhesion (psi) | 245 | 652 | 478 | 979 |

[1]1,3-Diphenyltetramethoxydisiloxane
[2]Catalyst: Reaxis 216 from Reaxis Inc.
[3]Filler: calcium carbonate filler.
[4]Other ingredients are the same for all formulations, including crosslinker 2 g (Geniosil GF 91 from Wacker Chemie AG); moisture Scavenger 2.6 g (Dynasylan VTMO from Evonik Corp); rheology modifier 2 g (Rilanit M from BASF); and TiO$_2$ colorant 15 g.

Adding small amounts of siloxane additive surprisingly increased adhesion strength of the resulting curable adhesive compositions.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A silane modified copolymer that is the reaction product of an aminosilane and an isocyanate functional copolymer, wherein the isocyanate functional copolymer is the reaction product of a polyether polyol having a number average molecular weight greater than 6000 and an amine based diol containing secondary hydroxyl groups and a cycloaliphatic diisocyanate.

2. The silane modified copolymer of claim 1 wherein said aminosilane comprises at least one secondary amine function and alkoxy functional groups attached to at least one silicon atom.

3. The silane modified copolymer of claim 1 wherein said aminosilane is bipodal and comprises at least one secondary amine function and alkoxy functional groups attached to its silicon atoms.

4. The silane modified copolymer of claim 1 wherein said amine based diol containing secondary hydroxyl groups has a number average molecular weight of less than 6,000, and at least one tertiary amine group.

5. The silane modified copolymer of claim 1 wherein said amine based diol containing secondary hydroxyl groups is present in a positive amount of less than 50 wt. % based on a total combined weight of said amine-based diol polyether polyol.

6. The silane modified copolymer of claim 1 wherein said polyether polyol is present in an amount of greater than 50 wt. % based on a total combined weight of said amine-based diol and said polyether polyol.

7. A composition comprising the silane modified copolymer of claim 1 and further comprising an isocyanate functional reaction product of a polyether polyol having a molecular weight greater than 6000 and a cycloaliphatic diisocyanate.

8. A composition comprising the silane modified copolymer of claim 1 and further comprising an isocyanate functional reaction product of a polyether polyol having a molecular weight greater than 6000 and a cycloaliphatic diisocyanate, and an isocyanate functional reaction product of an amine based diol containing secondary hydroxyl groups and a cycloaliphatic diisocyanate.

9. An adhesive composition comprising the silane modified copolymer of claim 1.

10. A moisture curable adhesive composition comprising the silane modified copolymer of claim 1 and a silane modified polymer having a structure different from the silane modified copolymer.

11. A moisture curable adhesive composition comprising the silane modified copolymer of claim 1 and a hydrolysable siloxane oligomer.

12. A method of forming an adhesive comprising the steps of:
a) forming a mixture of different isocyanate terminated prepolymers by reacting a mixture of an amine based diol containing secondary hydroxyl groups, a polyether polyol having a number average molecular weight greater than 6000 and a cycloaliphatic diisocyanate, optionally in the presence of a urethane catalyst; and
b) reacting the mixture of different urethane terminated prepolymers of step a) with at least one aminosilane, thereby forming an adhesive additive comprising silane terminated copolymers.

13. The method according to claim 12 wherein step a) comprises providing as the amine based diol containing secondary hydroxyl groups an amine-based polyether polyol having a number average molecular weight of less than 6,000, at least one tertiary amine group and a functionality of 2 or greater.

14. The method according to claim 12 wherein step a) comprises providing the amine based diol containing secondary hydroxyl groups in a positive amount of less than 50 wt. % based on a total combined weight of the amine based diol containing secondary hydroxyl groups and the polyether polyol having a molecular weight greater than 6000.

15. The method as recited in claim 12 wherein the amino silane is step b) is bipodal.

* * * * *

UNITED STATES PATENT AND TRADEMARK OFFICE
CERTIFICATE OF CORRECTION

PATENT NO. : 11,236,193 B2
APPLICATION NO. : 16/671697
DATED : February 1, 2022
INVENTOR(S) : Wu Suen et al.

It is certified that error appears in the above-identified patent and that said Letters Patent is hereby corrected as shown below:

In the Specification

Column 3, Line 66 change "3-am inopropyltriethoxysilane" to --3-aminopropyltriethoxysilane--.

Signed and Sealed this
Eleventh Day of October, 2022

Katherine Kelly Vidal
Director of the United States Patent and Trademark Office